United States Patent [19]

Haraikawa et al.

[11] 4,311,214
[45] Jan. 19, 1982

[54] DISC BRAKE

[75] Inventors: Tetsuo Haraikawa, Funabashi; Koichi Tamura, Tokyo, both of Japan

[73] Assignee: Tokico Ltd., Japan

[21] Appl. No.: 113,270

[22] Filed: Jan. 18, 1980

[30] Foreign Application Priority Data

Jan. 19, 1979 [JP] Japan .................................. 54-5683

[51] Int. Cl.³ ............................................ F16D 66/02
[52] U.S. Cl. ................................................. 188/1.11
[58] Field of Search ............. 116/208; 188/1 A, 73.3, 188/73.5

[56] References Cited

FOREIGN PATENT DOCUMENTS 2537622  3/1976  Fed. Rep. of Germany ..... 188/1 A

Primary Examiner—Duane A. Reger
Attorney, Agent, or Firm—Wenderoth, Lind & Ponack

[57] ABSTRACT

A disc brake including a stationary member secured to a non-rotatable part of a vehicle, and a friction pad disposed on each side of a rotatable disc. There is provided a wear warning piece one end of which is secured to the stationary member and the other end of which extends between the disc and a backing plate of the friction pad by a predetermined distance.

7 Claims, 4 Drawing Figures

DISC BRAKE

BACKGROUND OF THE INVENTION

This invention relates to disc brakes and, particularly, to disc brakes having a friction pad wear warning device.

It is necessary to exchange friction pads of a disc brake when the wear of friction materials of the friction pads exceeds a predetermined amount so as to safely operate a vehicle. However, it is difficult for typical drivers to timely inspect the friction pads to note that the friction pads should be changed. Moreover, at times, the friction pads are not changed until the friction materials thereof have completely worn away and the braking force has been decreased substantially due to e.g. the metal-to-metal contact between the disc and the backing plate of the friction pad.

Accordingly, various types of friction pad wear warning devices have been proposed for detecting the wear of the friction pad and generating a warning signal when the amount of wear of the friction pad exceeds a predetermined amount thereby notifying the driver of the vehicle that the friction pad should be changed. There are problems in conventional friction pad wear warning devices generating the warning signals electrically or mechanically such that the construction thereof is complicated or that the devices do not operate reliably.

SUMMARY OF THE INVENTION

An object of the present invention is to provide a disc brake having a friction pad wear warning device which is simple in construction, reliable in operation and practical in use, thereby solving the problems aforementioned.

The disc brake according to the present invention comprises, secured to a non-rotatable part of a vehicle, at least one friction pad disposed on one side of a rotatable disc, and a wear warning piece with one end thereof being secured to the stationary member and the other end thereof extending between the disc and a backing plate of the friction pad.

BRIEF DESCRIPTION OF THE DRAWINGS

The present invention will now be explained in detail with reference to the drawings illustrating a preferred embodiment, in which.

DETAILED DESCRIPTION OF THE PREFERRED EMBODIMENTS

Figure 1:
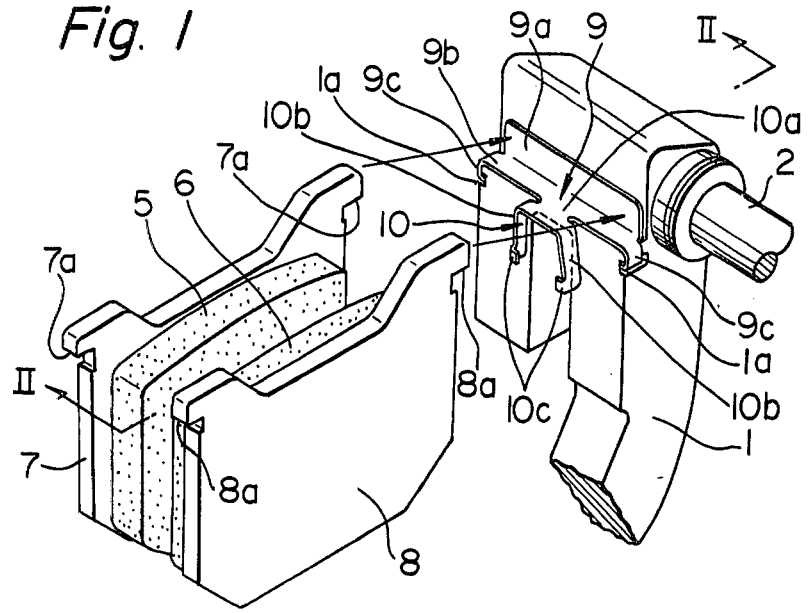
FIG. 1 is a perspective view showing the essential portion of a disc brake according to the present invention.
Figure 2:
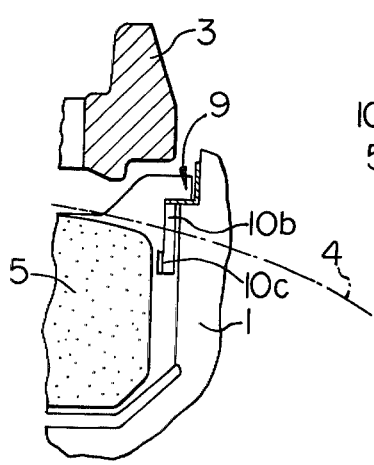
FIG. 2 is a sectional view as viewed along line II—II in FIG. 1.

FIG. 1 illustrates the essential portion of a disc brake of so-called floating caliper type to which the present invention can advantageously be applied. The disc brake comprises a stationary member 1 adapted to be secured to a non-rotatable part of a vehicle, and pins 2 (only one is shown in FIG. 1) provided on the stationary member 1 and spaced with one another in the direction of the circumference of a rotatable disc 4. A caliper 3 (a portion of which is shown in FIG. 2) is supported slidably on the pins 2. A piston (not shown) acts in one of limb portion of the caliper 3 for directly pressing a friction pad 6 against the disc 4. A friction pad 5, disposed opposingly to the friction pad 6 interposing the disc 4 therebetween, is applied to the disc 4 through the other limb portion of the caliper 3. The caliper 3 slidingly moves along the pins 2 by the reaction force transmitted from the disc 4 and through the friction pad 6 and the piston, whereby the disc 4 is clamped by the friction pads 5 and 6 and is braked. The friction pads 5 and 6 comprise respectively backing plates 7 and 8 and friction materials secured thereto. Supporting portions or lugs 7a and 8a are provided on the upper portions of circumferentially opposite sides of respective backing plates 7 and 8 and are slidingly supported on guides 9 (only one is illustrated in FIG. 1) of the stationary member 1.

The guides 9 are preferably formed of a metal plate such as stainless steel or the like, thereby increasing the strength, particularly, the abrasion hardness of the stationary member 1, which is usually formed of such as aluminum alloy or the like, at the location supporting slidingly the friction pads and, further, prevent the supporting portions 7a and 8a of the friction pads 5 and 6 from corrosion seizure.

According to the embodiment of the present invention illustrated in FIG. 1, a pair of wear warning pieces 10 is integrally provided on one of guides 9. The guide 9 comprises a vertically extending portion 9a and a horizontally extending portion 9b formed integrally with the portion 9a. The opposite ends of the horizontal portion 9b in the direction of the axis of the disc are bent downward to form retaining portion 9c which are fitted in slits 1a and 1a formed respectively in the stationary member 1, whereby the guide 9 is secured to the stationary member 1. Each wear warning piece 10 comprises a first portion 10b extending vertically (or radially with respect to the disc) and generally along the surface of the disc, and a second portion 10c formed on the lower (radially inward) end of the first portion 10b to extend toward the disc 4. The upper ends of respective first portion 10b of the wear warning piece 10 joins at a horizontally extending portion 10a which is formed integrally with the horizontally extending portion 9b of the guide 9. As clearly shown in FIG. 2, the second portion 10c of the wear warning piece is located between the disc 4 and the backing plate 7 or 8, and circumferentially outside of friction materials of the friction pads 5 and 6 so that the movement of the wear warning piece will not be obstructed by the friction materials of the friction pad.

Figures 3A, 3B:
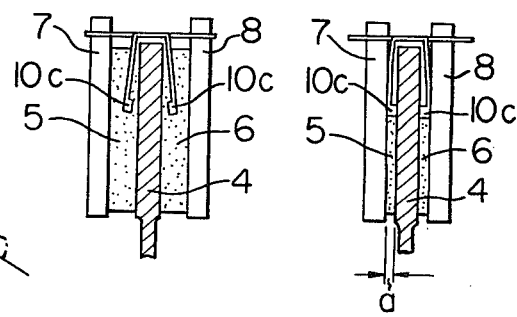
FIGS. 3a and 3b are explanative views illustrating the operation of the wear warning piece.

When the amount of the wear of the friction pads increases and the thickness of remaining friction materials of the friction pad 5 or 6 decreases to a predetermined amount a (FIG. 3b), the second portion 10c of the wear warning piece 10 engages with the backing plate of the friction pad and with the surface of the disc in applying the brake. A keen vibrational noise will generate on the wear warning piece 10 by the engagement of the second portion 10c and the rotating disc, thereby informing the driver of the vehicle that the friction pad should be replaced by a new one.

By determining the amount a or the width of the second portion 10c of the wear warning piece 10 in the direction of the axis of the disc 4, it is possible to generate the warning signal well before the friction materials of the friction pad have worn completely and thereby, the braking function can reliably be maintained.

In the embodiment, two wear warning pieces are symmetrically provided on the opposite sides of the disc 4, but the wear warning piece 10 may be provided only on one side of the disc 4, alternatively, the wear warning pieces may be formed on each of the guides 9. In the embodiment, the wear warning piece is formed integrally on the guide 9 by such as press work or the like, thus, the wear warning piece can be installed in its position by simply mounting the guide 9 on the stationary member 1, however, the warning piece 10 may be formed separate from the guide 9 and secured thereto by suitable means such as welding, caulking, screw connection or the like.

In the embodiment, the friction pads 5 and 6 are slidably mounted on the stationary member, however, the present invention may be applied to disc brakes of the type wherein one of the friction pads is supported on the stationary member and the other friction pad is secured to the caliper or is supported slidably on pins projecting from the stationary member. In such case, the wear warning piece may be provided in conjunction with the friction pad directly supported on the stationary member, and the wear warning piece in conjunction with the other friction pad may be omitted.

Further, the present invention may be applied to disc brakes of so-called opposing piston type.

The friction pad wear warning device according to the invention is reliable in operation, simple in the construction, inexpensive in production, easy to mount on existing disc brakes without necessitating any particular modifications.

What is claimed is:

1. A disc brake comprising:
   a stationary member secured to a non-rotatable part of a vehicle,
   a pair of friction pads disposed on opposite sides of a rotatable disc,
   backing plates on which said pads are mounted, portions of said backing plates being in spaced opposed relationship on opposite sides of said disc,
   a guide plate interposed between said stationary member and said friction pads for slidably guiding the friction pads in the direction of the rotational axis of the disc upon actuating the brake,
   a pair of wear warning members, each of which being integral with said guide plate and extending between said disc and each backing plate of each of the friction pads, in the space where said backing plates are spaced opposed, a sufficient distance to contact the disc when urged by the backing plates upon actuation of the brake, when the pads reach a predetermined level of wear and whereupon an audible warning signal is produced.

2. A disc brake as set forth in claim 1 wherein the guide plate is secured to the stationary member.

3. The disc brake as set forth in claim 1 wherein each of the wear warning members has a first portion extending substantially in the radially inward direction with respect to the disc and a second portion extending from the radially innermost end of the first portion towards said disc.

4. The disc brake as set forth in claim 1 wherein the wear warning members are symmetrically disposed with respect to the rotational plane of the disc.

5. The disc brake as set forth in claim 1 wherein the warning members are formed by bending part of the guide plate.

6. The disc brake as set forth in claim 1 wherein the guide plate is formed of a more abrasion resistant material than the stationary member to protect the stationary member from abrasion due to contact with the backing plate.

7. The disc brake as set forth in claim 6 wherein said stationary member is formed of aluminum alloy and said guide plate is formed of stainless steel.

* * * * *